UNITED STATES PATENT OFFICE.

HOMER ROGERS, OF WILMINGTON, DELAWARE, ASSIGNOR TO E. I. DU PONT DE NEMOURS AND COMPANY, OF WILMINGTON, DELAWARE, A CORPORATION OF DELAWARE.

METHOD OF PRODUCING ALKYL ANILINES.

1,413,494.  Specification of Letters Patent.  Patented Apr. 18, 1922.

No Drawing. Application filed July 7, 1917, Serial No. 179,247. Renewed September 27, 1920. Serial No. 413,250.

*To all whom it may concern:*

Be it known that I, HOMER ROGERS, of Wilmington, in the county of New Castle and in the State of Delaware, have invented a certain new and useful Improvement in Methods of Producing Alkyl Anilines, and do hereby declare that the following is a full, clear, and exact description thereof.

My invention relates particularly to a process for producing alkyl anilines but especially dimethylaniline by the treatment of aniline and methyl alcohol with an alkylphenylammonium iodide.

The object of my invention is to provide a process of this character by means of which alkyl anilines, as for example, dimethylaniline may be advantageously produced by the action of a compound containing iodine, and especially an alkyl iodide on aniline and an alcohol. A further object of my invention is to provide a process of this character in which the catalyst present is an alkylphenylammonium iodide such as trimethylphenylammonium iodide.

A further object is to avoid the loss of iodine which occurs when uncombined iodine is used as a catalyst thereby avoiding the great expense incident to the loss of such an expensive catalyst.

A further object is to avoid the necessity of separating out the uncombined iodine at the end of the process where uncombined iodine is the catalyst used. The recovery of such uncombined iodine has necessitated the distillation of the alcohol water layer containing the same so as to recover the methyl alcohol present and then the evaporation of the residue to dryness, after which the residue was subjected to treatment with sodium nitrite and sulphuric acid, then to filtration to obtain the crude iodine, the latter was finally purified by resublimation. In accordance with my invention it is not necessary to thus separate out the iodine since alkylpheylammonium iodide which is produced in the process may be used subsequently as a catalyst.

While my invention is capable of being carried out in many different ways for the purpose of illustration I shall describe only one way of carrying out the same hereinafter.

For example, I may proceed as follows: A quantity of aniline and methyl alcohol is mixed together with a small amount of methyl iodide in the following proportions:

93 parts aniline.
96 parts methyl alcohol.
1.35 parts methyl iodide.

The amount of the methyl iodide required is much less than would be required if the reaction were one of mere methylation so that the proportion of iodide may be said to be substantially less than a molecular proportion. Its function is that of a catalyst. After the reaction is started the dimethylaniline formed from the methyl alcohol and aniline by the catalytic action of the methyl iodide combines with at least part of the methyl iodide to form an addition compound. This compound formed by the combination of methyl iodide with dimethylaniline is trimethylphenylammonium iodide and performs the same function as does the methyl iodide itself. The treatment is carried out in a digester at an elevated temperature. The liquids contained in the digester separate into two layers, one containing crude dimethylaniline and the other the excess of alcohol, together with water formed in the reaction and the trimethylphenylammonium iodide. The two layers are separated from one another and the layer containing the catalyst which is dissolved in water is first heated in a still in order to recover the methyl alcohol present and the residue is evaporated to dryness to recover the trimethylphenylammonium iodide usually mixed with small amounts of other substances. The trimethylphenylammonium iodide, from which the other substances may or may not have been removed is then ready for further use, in making a methyl aniline from aniline and methyl alcohol. If desired the process may be begun by the application of this compound as a catalyst instead of methyl iodide. Other compounds of iodine act in a similar way. For example, hydrogen iodide or ammonium iodide have been found to serve the purpose instead of methyl iodide.

The present invention is an improvement on the process described and claimed in the application of Arthur E. Houlehan, Serial No. 179,228; this latter application is directed broadly to a process of making alkylanilines in which iodides are used as catalysts, and specifically to the steps of a two-cycle process in which methyl iodide is used in the first cycle, and a mixture of iodides obtained as a by-product from the first cycle is used as the catalyst in the second cycle. The present invention is directed to a process of making alkylanilines in which the catalyst is trimethylphenylammonium iodide.

While I have described my invention above in detail, I wish it to be understood that many changes may be made therein, without departing from the spirit of my invention.

I claim:

1. The process which comprises producing an alkyl aniline by subjecting aniline and an alcohol to an alkyl phenylammonium iodide.

2. The process which comprises producing dimethylaniline by subjecting aniline and methyl alcohol to trimethylphenylammonium iodide.

3. The process which comprises producing an alkyl aniline by subjecting aniline and an alcohol while heated to an alkyl phenylammonium iodide.

4. The process which comprises producing dimethylaniline by subjecting aniline and methyl alcohol while heated to the action of trimethylphenylammonium iodide.

5. The process which comprises producing an alkyl aniline by subjecting aniline and an alcohol to the action of an alkyl phenylammonium iodide, separating the two layers formed, and recovering the alkyl phenylammonium iodide by evaporating to dryness the layer containing the same.

6. The process which comprises producing dimethylaniline by subjecting aniline and methyl alcohol to the action of trimethylphenylammonium iodide, separating the two layers formed, and recovering the trimethylphenylammonium iodide by evaporating to dryness the layer containing the same.

7. The process which comprises producing an alkyl aniline by subjecting aniline and an alcohol while heated to the action of an alkyl phenylammonium iodide, separating the two layers formed, and recovering the alkyl phenylammonium iodide by evaporating to dryness the layer containing the same.

8. The process which comprises producing dimethylaniline by subjecting aniline and methyl alcohol while heated to the action of trimethylphenylammonium iodide, separating the two layers formed, and recovering the trimethylphenylammonium iodide by evaporating to dryness the layer containing the same.

9. The process which comprises producing an alkyl aniline by subjecting aniline and an alcohol to the action of an alkyl phenylammonium iodide, separating the two layers formed, and recovering the alkyl phenylammonium iodide by distilling off the excessive alcohol from the layer containing the same.

10. The process which comprises producing dimethylaniline by subjecting aniline and methyl alcohol to the action of trimethylphenylammonium iodide, separating the two layers formed, and recovering the trimethylphenylammonium iodide by distilling off the excessive alcohol from the layer containing the same.

11. The process which comprises producing an alkyl aniline by subjecting aniline and an alcohol while heated to the action of an alkyl phenylammonium iodide, separating the two layers formed, and recovering the alkyl phenylammonium iodide by distilling off the excessive alcohol and by evaporating to dryness the layer containing the same.

12. The process which comprises producing dimethylaniline by subjecting aniline and methyl alcohol while heated to the action of trimethylphenylammonium iodide, separating the two layers formed, and recovering the trimethylphenylammonium iodide by distilling off the excessive alcohol from the layer containing the same.

13. The process of producing an alkyl aniline which comprises heating a mixture of aniline, an alcohol and substantially less than a molecular proportion of an alkyl iodide, separating the two layers formed, recovering the alkyl iodide in the form of an alkylphenylammonium iodide, and treating additional quantities of aniline and an alcohol with said alkylphenylammonium iodide to produce an additional quantity of an alkyl aniline.

14. The process of producing dimethylaniline which comprises heating aniline, methyl alcohol, and substantially less than a molecular proportion of methyl iodide, separating the two layers formed, recovering the methyl iodide in the form of trimethylphenylammonium iodide, and treating additional quantities of aniline and methyl alcohol with said trimethylphenylammonium iodide to produce an additional quantity of dimethylaniline.

In testimony that I claim the foregoing I have hereunto set my hand.

HOMER ROGERS.

Witnesses:
R. S. WILLIAMS,
E. S. VAN DEMARK.